Figure 1:
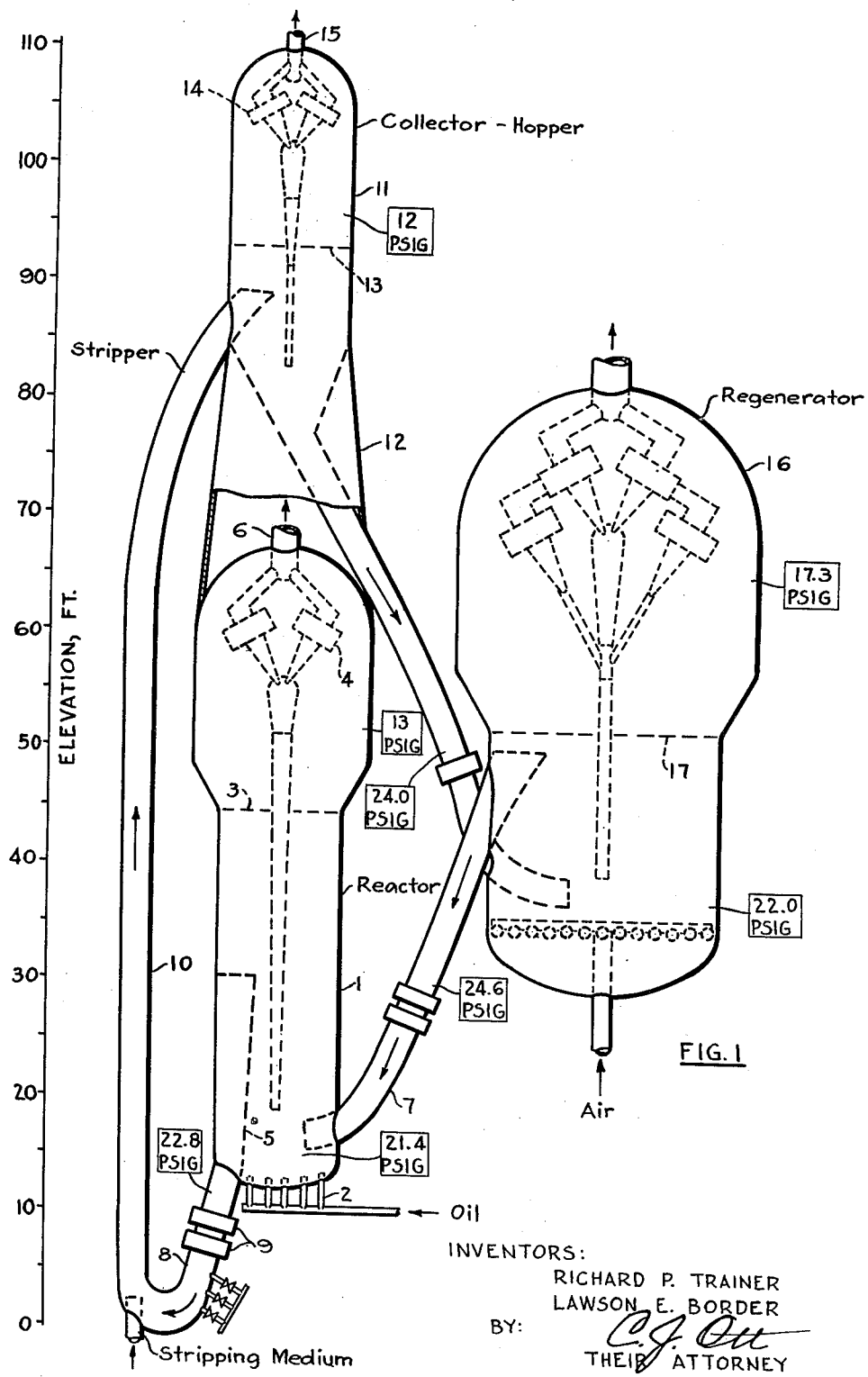

INVENTORS:
RICHARD P. TRAINER
LAWSON E. BORDER
BY: C. J. Ott
THEIR ATTORNEY

Patented May 6, 1952

2,595,909

UNITED STATES PATENT OFFICE 2,595,909

METHOD AND APPARATUS FOR TREATING HYDROCARBON OILS

Richard P. Trainer, Amityville, N. Y., and Lawson E. Border, Westwood, N. J., assignors to Shell Development Company, San Francisco, Calif., a corporation of Delaware Application December 5, 1949, Serial No. 131,102

3 Claims. (Cl. 196—52)

This invention relates to the novel and advantageous method and apparatus for the treatment of hydrocarbon oils using a powdered catalyst. The invention relates particularly to the catalytic cracking of hydrocarbon oils using the so-called fluidized catalyst technique.

The catalytic cracking of hydrocarbon oils with a powdered cracking catalyst using the so-called fluidized catalyst technique is widely used and well-known, and consequently it is considered unnecessary to discuss the fundamentals of this process (see the Petroleum Refiner, pp. 435–442, September 6, 1946).

The object of the invention is to provide a method and apparatus for the treatment of hydrocarbon oils and especially the catalytic cracking of hydrocarbon oils, which is more advantageous from the standpoint of capital cost, operating cost, maintenance and efficiency than the systems presently employed for this purpose or hitherto suggested. The advantages of the present method and apparatus are obtained by operating in a novel manner which not only offers certain advantages in improving the efficiencies of certain steps of the process, avoiding certain defects encountered in the hitherto known methods, and decreasing the operating costs, but also allows a most practical and less costly plant to be used. The combination of these advantages allow the desired treatment of the hydrocarbon oil to be carried out at an appreciably lower cost per barrel of feed or product and it is this consideration which makes the process a significant improvement for commercial operation. The various advantages will be pointed out and will be explained in more detail after describing the process and the apparatus.

The method and apparatus of the present invention are illustrated semi-diagrammatically in Figure 1 of the accompanying drawing. The particular plant illustrated is designed for 10,000 barrels per day capacity, and is illustrated approximately to the scale of 1 to 120.

The reactor 1 is the lowest of the three major vessels. In the particular reactor illustrated, the bottom is rounded, or elliptical, rather than of the usual conical shape and is provided with a plurality of oil jets 2 for the introduction of the oil to be cracked. The vessel is designed to operate with approximately 50 tons of catalyst which, at a density in a fluidized condition of about 42 pounds per cubic foot, has a normal upper level about 30 feet above the bottom of the reactor and approximately as indicated by the broken line 3. The vessel is swaged from a lower diameter of about 10 feet to an upper diameter of about 15 feet so that the normal superficial vapor velocity decreases from about 1.6 feet per second to about 1.1 feet per second in going from the lower section to the upper section. A cyclone separator 4 is located in the upper disengaging space in the conventional manner and serves to separate catalyst particles entrained in the outgoing hydrocarbon vapors. A skirt or baffle 5 extends from the bottom of the reactor to near the top of the dense bed of catalyst in the reaction zone. This skirt serves two purposes. By withdrawing the spent catalyst from a point near the top of the bed the hydrocarbon vapors entrained in the interstices are largely cracked products of lower molecular weight rather than the uncracked feed which predominates at the lower levels. Thus, less pounds of hydrocarbon escape with the spent catalyst and the stripping is facilitated. Also the less violently agitated catalyst inside the baffled section has a higher density than that in the reaction zone and this permits a lower overall height of the unit than if the effluent catalyst were withdrawn at a lower level.

In the process of the invention, the reactor operates under an appreciable pressure and in the case illustrated, the disengaging space is under a back pressure of about 13 p. s. i. g. This back pressure may be imposed by a valve in the exit line 6 (not shown) or by any other conventional means. A line 7 is arranged to discharge freshly regenerated catalyst at a point near the bottom of the fluidized bed of catalyst in the reactor and below the top of the skirt 5. Critical features of the reactor illustrated are its relatively high operating pressure and the spatial relationship of the inlet for regenerated catalyst and the outlet for the partially spent catalyst. The relatively flat bottom of the reactor with direct introduction of the oil to be cracked constitutes an advantageous innovation hitherto not applied in such systems, but it is not an essential feature of the apparatus or method of the invention. Aside from the critical factors mentioned, the reactor need not necessarily conform to the particular design illustrated. Various modifications affording the critical features will be apparent to those skilled in the art.

The reactor illustrated is designed to operate at a temperature of about 925° F. and a catalyst to oil ratio of about 10–12:1 with a silica-alumina cracking catalyst such, for instance, as the 3A catalyst currently produced and sold by the American Cyanamid Company. It is to be understood, however, that the temperature and catalyst to oil ratio may vary over the conventional ranges and that any other solid cracking catalyst such, for example, as the silica-magnesia cracking catalyst or the conventional activated clay cracking catalyst, may be used. In fact, such materials as bauxite and spent clay used in the treating of lubricating oils may be used as the catalyst in such cases where only a mild cracking is desired. The catalyst must, however, be sufficiently finely divided to allow it to be fluidized and generally it is in the form of a powder which substantially completely passes a 100 mesh standard sieve.

Partially spent catalyst is withdrawn from the reactor through the partitioned section via line 8 at a rate controlled by slide valves 9. The partially spent catalyst containing appreciable amounts of adsorbed and occluded hydrocarbons passes directly into a long narrow stripping chamber 10 which, in the case illustrated, is about 2 feet in diameter and 85 feet long, wherein it is picked up by a stream of stripping gas, e. g., steam, and carried upward as a dilute light or disperse phase (as distinguished from a fluidized or pseudo liquid phase) to a separating and collecting hopper 11. The ratio of length to diameter of the stripper should be such as to afford a slip factor of less than about 2. In the particular case illustrated the vapor velocity is about 40 feet per second; the pressure at the bottom of the stripper is about 19 p. s. i. g. and the pressure at the top of the stripper is about 13.5 p. s. i. g. It will be noted that in this case the catalyst is stripped of hydrocarbons while in a dilute or suspended state and while flowing upwardly and concurrently with the stripping medium under constantly decreasing pressure. This feature of the illustrated system is also of importance and its advantages will be later referred to and explained.

The elevated separator-hopper 11, which is the most elevated of the major vessels, is provided to separate the catalyst from the stripped vapors and stripping medium and to collect the separated catalyst in an elevated fluidized bed. It is a relatively small vessel compared to the reactor and regenerator and may be supported by a skirt 12 extending upwardly from the reactor. In the particular case illustrated, the separator-hopper 11 is about ten feet in diameter and is designed to hold about fifteen tons of catalyst when operating at a normal catalyst level, such as indicated by the broken line 13. A cyclone separator 14 is provided in the upper part of the separator-hopper 11 above the normal catalyst level to separate and return entrained catalyst from the exit gases which leave via line 15. In the particular case illustrated, the disengaging space in the separator-hopper 11 is under a back pressure of about 12 p. s. i. g., which back pressure may be imposed by any conventional means (not shown). The stripped hydrocarbons and the steam or other stripping gas withdrawn via line 15 may be further handled or treated in any desired conventional manner.

The regenerator 16 is the largest of the vessels and is intermediate in elevation between the reactor and the separator-hopper 11. In the particular case illustrated, the regenerator is designed to operate at about 1100° F. with about 125 tons of catalyst. The diameter of the lower section of the regenerator is about 25 feet and affords a normal depth of catalyst of about 20 feet and a normal operating level approximately as indicated by the broken line 17. The spatial relationship of the regenerator, the separator-hopper and the reactor are such that with a minimum overall height, the stripped catalyst flows as a pseudo liquid having a density of, for example, about 35 pounds per cubic foot by gravity against a positive head into the regenerator and, in addition, regenerated catalyst flows as a pseudo liquid by gravity into the reactor.

It will be noted that in the system just described there is no reactor riser. One of the focal points of erosion and high maintenance costs in existing plants of the conventional type is in the reactor riser. The elimination of this costly line not only decreases the cost and maintenance of the plant but also allows the reactor to be placed essentially at ground level.

It will also be noted that in the system just described there is no regenerator riser. This affords the distinctive advantage that blower power for the transfer of spent catalyst is not necessary. The blower may be located directly below the regenerator with a straight discharge line connected to the perforated pipe distributor. These features allow the pressure drop from the blower through the distributor to be decreased to about 1 p. s. i. as compared to about 6.5 p. s. i. in conventional units. These features allow the described increase pressure in the regenerator, and this in turn allows the regenerator to be lowered materially. Another advantage of the arrangement is that it is possible to start the air-blower without having to first remove the catalyst from the system. This is not possible in existing units where, if the air flow is stopped, the catalyst packs in the riser. Since the low-head blower required is not capable of re-establishing flow when the riser is packed with catalyst, it is conventional to provide two blowers. In the described system only one blower is required.

It will be appreciated that while it is possible to design a fluidized catalyst catalytic cracking plant in which a given vessel, such as the reactor, operates at any desired high or low pressure, the choice of any such pressure dictates the pressures throughout the plant. Thus, while the absolute magnitudes of the pressures are of importance in determining the cost and efficiency of the plant, the relationships of the various pressures are also of importance. These relationships are dictated solely by the spatial relationships of the major vessels and the methods used in transporting the catalyst throughout the system. Thus, in the conventional modern design, widely used in industry, the pressure in the upper section of the reactor is about 12.5 p. s. i. g.; the pressure in the stripper is somewhat higher than 12.5 p. s. i. g. and the pressure in the upper section of the regenerator is about 10 p. s. i. g. In another design, the pressure in the reaction is only 9 p. s. i. g. and the pressure in the regenerator is 17.5 p. s. i. g. Thus, through the different spatial relationships of the vessels, the relationships of the pressures are reversed. The system illustrated in Figure 1, on the other hand, has a different pressure relationship which combines the good points of the previous designs and also affords additional advantages. Thus, the system illustrated in Figure 1 combines a relatively high reactor pressure with a relatively high regenerator pressure. Also, in the system illustrated in Figure 1 the stripping zone operates at a pressure which is below that of either the reactor or regenerator instead of higher as in most previous designs. This particular arrangement which depends upon and utilizes the above described flows and stripping technique, not only allows the reactor and regenerator to be made smaller in size with a reduction in weight and cost, but it also allows the heavier equipment to be placed at a lower level which is a considerable advantage both from the standpoint of a less costly supporting structure and from the standpoint of cost, erosion, maintenance and heat loss in the various piping lines associated with the plant.

It will also be noted that in the system described the conventional reactor grid is no longer necessary. This not only has the advantage of eliminating this costly piece of equipment, but the method also prevents overcracking of the feed explained above.

The described system of flow not only allows the reactor to be placed substantially at ground level and the regenerator at low level, but it also allows the overall height of the plant to be held at a minimum. Thus, as illustrated, a plant having a capacity of 10,000 barrels per day is only about 110 feet high and that part above about the 55 foot level consists only of relatively light parts which do not require an elaborate supporting structure. The low height and low center of gravity, so to speak, are both important factors in the increased economy of the present process.

The particular stripping technique utilized in the method and apparatus of the present invention not only effects improved stripping of the partially spent catalyst in a novel and very practicable manner, but when combined in the manner indicated, affords other important advantages. Thus, it will be noted that in the method and apparatus of the invention, the catalyst flows as a dense phase, i. e., a pseudo liquid having a density of, for example, about 35 pounds per cubic foot, to the regenerator and also from the regenerator to the reactor. This not only allows the desired pressure relationship to be obtained, but also allows the catalyst to be transported through smaller lines at a low velocity. This latter feature is of considerable practical importance since the transportation of the necessary volume of catalyst in a dispersed phase requires pipes of very large diameter which are, furthermore, difficult and costly to maintain due to the severe erosion to which they are subjected. In the method and apparatus of the invention the circulation of catalyst in the dispersed phase (which must be used in transporting the catalyst in an upward or horizontal direction) is minimized.

In the application of the fluidized catalyst technique to the catalytic cracking of hydrocarbon oils, the heat required in the reactor is supplied by the hot catalyst introduced into the reaction zone from the regeneration zone. Thus, for example, if the catalytic cracking zone is operated at a temperature of, say, 925° F., catalyst from the regenerator is charged at a temperature of, say, 1100° F. The amount of such hot catalyst required depends upon the particular oil being cracked, the heat losses in the plant, and other factors, but is usually in the order of 2–12 parts per part of oil by weight. In the conventional design this hot regenerated catalyst is introduced into the reactor with and by the oil feed. This, is is found, results in substantial overcracking of part of the oil with consequent increase in the coke production. In the method and apparatus of the invention, the hot regenerated catalyst and the oil to be cracked are separately introduced into the reaction zone. Thus, preliminary contact of the oil with the very hot regenerated catalyst is avoided.

A further advantage afforded by the method and apparatus of the invention is that the material stripped from the spent catalyst in the stripper 10 may be separately recovered. While other designs have been suggested wherein this is possible, such designs have had other disadvantages which have prevented their application, and in the accepted designs the stripped products are combined with the main product stream. As pointed out, the hydrocarbon material entrained with the spent catalyst from the reactor consists generally of cracked products. The recovered material is highly aromatic. Another advantage inherent in the system is that, in comparison with conventional systems, the size of the reactor and the product fractionator may be reduced, since these are not required to accommodate the stripping steam. Still another advantage of this system is that air may be injected at the bottom of the stripping zone if desired to increase the temperature in the stripper by partial combustion without overloading the gas recovery system with combustion gases. Still another advantage of the described system is that it is possible with very minor modification of the system to employ flue gases directly from the regenerator as the stripping medium. The only alteration required is to supply a line from the top of the rengerator to the stripping gas inlet and to increase the height of the collector-hopper vessel somewhat to increase the pressure in the upper part of the regeneration zone.

While the method and apparatus of the invention were developed in the catalytic cracking of hydrocarbon oils and the invention has been described as applied for that purpose, it is appreciated that the method and/or apparatus can also be applied without loss of the advantages for carrying out other processes which are similar to catalytic cracking in being amenable to the application of the fluidized catalyst technique and in requiring frequent regenreation of the catalyst by burning carbonaceous deposit therefrom. Examples of such processes are, for instance, the catalytic treatment of crude oil or heavy residues, such as described in U. S. Patent No. 2,378,531 and the treatment of gasoline or other relatively light oils with bauxite or similar catalysts to desulfurize them, refine them, and/or improve their ignition or burning characteristics. Although these processes and certain other related processes go by various names, such as catalytic reforming, iso-forming, catalytic viscosity breaking, etc., they are nevertheless similar in all basic respects to catalytic cracking and differ therefrom usually in the temperatures applied, or the particular character of the feed, or occasionally in some difference in the composition of the catalyst. In such process, although catalytic cracking may not be the predominant reaction, some minor amount of catalytic cracking is involved. It will be understood that in such related processes the various details of the described method and apparatus may be altered without destroying the basic features and relationships which are responsible for the improvements.

The claimed invention is:

1. The method for the treatment of a hydrocarbon liquid oil with a powdered catalyst, which comprises injecting the liquid oil to be treated directly into the lower portion of a pseudo liquid bed of the catalyst in a reaction zone maintained under reaction conditions of temperature and under a positive intermediate pressure (a), withdrawing spent catalyst from said bed of pseudo liquid catalyst at a point above the level of said introduction of said oil and decreasing the pressure thereon to a lower pressure (b), suspending the thus-withdrawn spent catalyst at said pressure (b) as a dilute suspension in a stream of stripping gas and passing the spent catalyst thus suspended in said stripping gas substantially vertically and concurrently through an elongated stripping zone to a separating and collecting zone at a higher elevation than said reaction zone, separating catalyst from the stripping gas in said separating and collecting zone and collecting the separated catalyst as a pseudo liquid bed in said zone, passing said pseudo liquid catalyst from said separating and collecting zone as a dense confined stream by gravity into the lower portion of a bed of pseudo liquid catalyst in a separate regeneration zone maintained at a higher pressure (c), and at an elevation intermediate of said separating and collecting zone and said reaction zone, withdrawing pseudo liquid catalyst from said bed of catalyst in said regeneration zone at a point above the level of introduction of said catalyst from said separating and collecting zone, decreasing the pressure on said last-mentioned withdrawn catalyst and passing the same after decreasing the pressure as a dense confined stream by gravity into said reaction zone at said intermediate pressure (a) at a point below the aforesaid point of withdrawing spent catalyst from the bed of pseudo liquid catalyst in said reaction zone.

2. An assembly of apparatus adapted for the treatment of materials in the vapor phase with a powdered solid using the fluidized powder technique which comprises in combination a fluid catalyst reactor vessel, means for injecting liquid oil at a plurality of points near the bottom of said reactor vessel, a fluid catalyst collector-separator substantially directly above said reactor vessel, a fluid catalyst regenerator vessel at the side of and intermediate in elevation between said ractor vessel and said collector-separator vessel, an elongated stripping chamber extending substantially vertically from the bottom of said reaction vessel to the bottom of said collector-separator, a conduit adapted for gravity flow for fluidized powder extending from the bottom of said collector-separator vessel into said regeneration vessel at a low point near the bottom thereof, and a second conduit adapted for gravity flow of fluidized powder extending from a higher point in said regeneration vessel to the said reactor vessel near the bottom thereof.

3. A fluid catalyst catalytic cracking plant comprising in combination a substantially cylindrical vertically disposed reactor vessel at substantially ground level, a plurality of nozzles extending into the bottom of said vessel and connected to a common header arranged to allow direct injection into liquid oil at a plurality of points into the bottom of said vessel, a narrow substantially vertical stripping chamber extending from the bottom of said reactor vessel to the lower part of a collector-separator vessel substantially directly above said reactor vessel, a regeneration vessel mounted at an elevation above that of said reactor vessel but below that of said collector-separator vessel, an inclined catastat connecting the bottom of said collector-separator vessel with substantially the bottom of said regeneration vessel, an inclined catastat extending from a point in said regeneration vessel above the level of the end of the first said catastat to substantially the bottom of said reaction vessel.

RICHARD P. TRAINER.
LAWSON E. BORDER.

REFERENCES CITED

The following references are of record in the file of this patent:

UNITED STATES PATENTS

| Number | Name | Date |
| --- | --- | --- |
| 2,387,309 | Sweeney | Oct. 23, 1945 |
| 2,437,352 | Fragen | Mar. 9, 1948 |
| 2,456,715 | Leffer | Dec. 21, 1948 |
| 2,464,812 | Johnson | Mar. 22, 1949 |
| 2,465,255 | Moorman | Mar. 22, 1949 |
| 2,509,745 | Riggs | May 30, 1950 |
| 2,517,042 | Skelly | Aug. 1, 1950 |